(12) United States Patent
Mukai

(10) Patent No.: US 9,111,388 B2
(45) Date of Patent: Aug. 18, 2015

(54) INFORMATION PROCESSING APPARATUS, CONTROL METHOD, AND RECORDING MEDIUM

(71) Applicant: SQUARE ENIX CO., LTD., Tokyo (JP)

(72) Inventor: Tomohiko Mukai, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 67 days.

(21) Appl. No.: 14/015,125

(22) Filed: Aug. 30, 2013

(65) Prior Publication Data

US 2014/0139529 A1    May 22, 2014

(30) Foreign Application Priority Data

Nov. 16, 2012    (JP) .................................. 2012-252582

(51) Int. Cl.
*G06T 11/20* (2006.01)
*G06F 17/17* (2006.01)

(52) U.S. Cl.
CPC ............. *G06T 11/203* (2013.01); *G06F 17/17* (2013.01)

(58) Field of Classification Search
None
See application file for complete search history.

(56) References Cited

FOREIGN PATENT DOCUMENTS

JP    11-272879    10/1999

OTHER PUBLICATIONS

Nikolaus Hansen et al., "Evaluating the CMA Evolution Strategy on Multimodal Test Functions", Parallel Problem Solving from Nature, PPSN 2004, Springer-Verlag, pp. 1-10 (2004).

Nikolaus Hansen, "The CMA Evolution Strategy: A Comparing Review", Springer-Verlag, pp. 75-102 (2006).

Extended European Search Report from European Patent Office (EPO) in European Patent Application No. 13183039.0, dated Apr. 1, 2014.

Yoshimoto, F. et al., "Data fitting with a spline using a real-coded genetic algorithm", XP002722004, Retrieved from the Internet: URL: http://www.sciencedirect.com/science/article/pii/S001044850300006X, retreived on Mar. 19, 2014, pp. 751-760 (2003).

Nikolaus Hansen, "The CMA Evolution Strategy: A Tutorial", XP002722005, Retrieved from the Internet: URL: https://www.lri.fr/~hansen/cmatutorial.pdf, retreived on Mar. 19, 2014, pp. 1-34 (Jun. 28, 2011).

(Continued)

*Primary Examiner* — David H Chu
(74) *Attorney, Agent, or Firm* — Greenblum & Bernstein, P.L.C.

(57) ABSTRACT

An information processing apparatus selects a plurality of interval width sequences of internal knots of a nonuniform B-spline that approximates waveform data, based on a multivariate normal distribution, and then determines a knot vector based on each of the selected interval width sequences and an optimal control point sequence for each knot vector. Also, the apparatus repeats, for a nonuniform B-spline that is defined for each combination of a knot vector and an optimal control point sequence corresponding to the knot vector, the selection of interval width sequences, the determination of knot vectors and optimal control point sequences and the evaluation thereof, until an evaluation whose objective function is minimized is obtained.

8 Claims, 3 Drawing Sheets

(56) References Cited

OTHER PUBLICATIONS

Vadym Voznyuk, "Motion compression by PCA 1-9 combined with high-degree polynomial regression", XP002722006, Retrieved from the Internet: URL: https://www.cs.ubc.ca/~van/cpsc526/Vjan2003/projects/voznyuk/voznyuk.html, retreived on Mar. 19, 2014, pp. 1-8 (Apr. 1, 2003).

Sudarsky, S. et al., "Motion Capture Data Manipulation and Reuse Via B-Splines", Modelling and Motion Capture Techniques for Virtual Environments. International Workshop, XP009066669, pp. 55-69 (Jan. 1, 1998).

INFORMATION PROCESSING APPARATUS, CONTROL METHOD, AND RECORDING MEDIUM

BACKGROUND OF THE INVENTION

1. Field of the Invention

The present invention relates to an information processing apparatus, a control method, and a recording medium, and particularly to a technology for performing function approximation of curves.

2. Description of the Related Art

In the field of computer graphics (CG), specific video scenes or the like are generated by defining an animation sequence (motion) with regard to formed models. Since animation generation using models is complex, in recent years the movement of real people, animals and the like have been incorporated and appropriated with motion capture systems.

In a motion capture system, markers are arranged at points where movement is to be captured, and these markers are captured at a predetermined frame rate with a plurality of cameras. The captured results are then integrated and motion capture data is generated as continuous data of three-dimensional positions or rotations of each point.

Since motion capture data generated in this way has the positions or rotations of each point for every frame, there is generally a large amount of information. That is, allocating this data as animation sequences of models can lead to an increase in the amount of data processing required in editing and an increase in the amount of data of packages such as games. Thus, a method of reducing the amount of information by approximating motion capture data with suitable basis spline curves (hereinafter, B-splines) is used, such as in Japanese Patent Laid-Open No. 11-272879.

A B-spline is defined by an interval polynomial in which internal knots are set in the time direction of the motion capture data, and a basis function is defined for each interval partitioned by the knots. There are uniform B-splines whose internal knots are arranged so as to divide the time direction equidistantly, and nonuniform B-splines whose internal knots are arranged freely. Nonuniform B-splines are used in the case of data that can include fast and slow movement such as motion capture data, since it is desirable to provide internal knots in a more concentrated manner in a dynamic sequence having a high frequency component in the time direction than in a static sequence having a low frequency component.

In Japanese Patent Laid-Open No. 11-272879, first internal knots are set at the start and end points, maximum and minimum points, local maximum and minimum points, inflection points, and local minimum points of the radius of curvature, and then after setting parameters at which the least-squares error is minimized for each interval, the knots are arranged using a technique according to which the internal knots are increased or decreased according to this error. However, the arrangement and number of knots that are arranged with a method such as Japanese Patent Laid-Open No. 11-272879 may possibly not be optimized. That is, there is an increase in the number of knots and the number of control points, possibly resulting in the data compression efficiency of the motion capture data being low.

Generally, optimization of the arrangement of the internal knots and control points of a nonuniform B-spline results in a highly-nonlinear multimodal problem having a plurality of local and global solutions. In recent years, evolutionary computation methods such as genetic algorithms and artificial immune systems, particle swarm optimization and the like that are efficient and have stable computational amounts have been used, in order to optimize the arrangement of the internal knots and control points of nonuniform B-splines. However, with these techniques it is necessary to preset parameters that are not intuitive for the typical user who lacks technical knowledge. Specifically, in the case of genetic algorithms, such parameters that are not intuitive for the typical user include the number of genes, the number of genes to be screened, the probability of hybridization, and the probability of mutation evolution. Also, in the case of particle swarm optimization, such non-intuitive parameters include the inertia constant and the percentage of particles that travel toward a favorable position. The user thus needs to change the parameters while repeatedly adjusting the parameters according to the approximation results.

SUMMARY OF THE INVENTION

The present invention was made in view of such problems in the conventional technique. The present invention provides an information processing apparatus, a control method, and a recording medium that are for approximating waveform data to a suitable nonuniform B-spline without requiring unnecessary parameter tuning by a user.

The present invention in its first aspect provides an information processing apparatus for optimizing an arrangement of internal knots and control points of a nonuniform B-spline that approximates waveform data, comprising: a selection unit which is able to select a plurality of nonuniform interval width sequences for a knot interval between internal knots, based on a multivariate normal distribution; a generation unit which is able to generate, for each of the plurality of interval width sequences selected by the selection unit, a knot vector that is based on the interval width sequence; a determination unit which is able to determine an optimal control point sequence for each of the knot vectors generated by the generation unit; an evaluation unit which is able to use an objective function to evaluate an approximation error with the waveform data, for a nonuniform B-spline defined for each combination of a knot vector and an optimal control point sequence corresponding to the knot vector; and a control unit which is able to perform control so as to repeat the selection of a plurality of interval width sequences by the selection unit, the generation of knot vectors by the generation unit, the determination of optimal control point sequences by the determination unit, and the evaluation by the evaluation unit, until an evaluation indicating that the approximation error has been converged to a value regarded as a minimum is obtained by the evaluation unit, wherein the control unit, in the case where an evaluation indicating that the approximation error has been converged to a value regarded as a minimum is not obtained by the evaluation unit, updates a mean and a variance of the multivariate normal distribution, based on a predetermined number of interval width sequences selected in ascending order of the approximation errors from the plurality of interval width sequences selected by the selection unit, and causes the operations to be repeated using the multivariate normal distribution after updating.

The present invention in its second aspect provides a method of controlling an information processing apparatus for optimizing an arrangement of internal knots and control points of a nonuniform B-spline that approximates waveform data, comprising: a selection step of a selection unit of the information processing apparatus selecting a plurality of nonuniform interval width sequences for a knot interval between internal knots, based on a multivariate normal distribution; a generation step of a generation unit of the information processing apparatus generating, for each of the plurality of interval width sequences selected in the selection step, a knot vector that is based on the interval width sequence; a determination step of a determination unit of the information processing apparatus determining an optimal control point sequence for each of the knot vectors generated in the generation step; an evaluation step of an evaluation unit of the information processing apparatus using an objective function to evaluate an approximation error with the waveform data, for a nonuniform B-spline defined for each combination of a knot vector and an optimal control point sequence corresponding to the knot vector; and a control step of a control unit of the information processing apparatus performing control so as to repeat the selection of a plurality of interval width sequences in the selection step, the generation of knot vectors in the generation step, the determination of optimal control point sequences in the determination step, and the evaluation in the evaluation step, until an evaluation indicating that the approximation error has been converged to a value regarded as a minimum is obtained in the evaluation step, wherein, in the control step, in the case where an evaluation indicating that the approximation error has been converged to a value regarded as a minimum is not obtained in the evaluation step, the control unit updates a mean and a variance of the multivariate normal distribution, based on a predetermined number of interval width sequences selected in ascending order of the approximation errors from the plurality of interval width sequences selected in the selection step, and causes the operations to be repeated using the multivariate normal distribution after updating.

The present invention in its third aspect provides a computer-readable recording medium storing a program for causing a computer to function as the units of the information processing apparatus.

Further features of the present invention will become apparent from the following description of exemplary embodiments (with reference to the attached drawings).

DESCRIPTION OF THE EMBODIMENTS

Hereinafter, illustrative embodiments of the present invention will be described in detail with reference to drawings. Note that the following embodiment describes an example in which the present invention is applied to a PC 100 that is capable of generating data approximating waveform data to a nonuniform B-spline as an exemplary information processing apparatus. However, the present invention is applicable to an arbitrary device capable of generating data approximating waveform data to a nonuniform B-spline.

Configuration of PC 100

Figure 1:
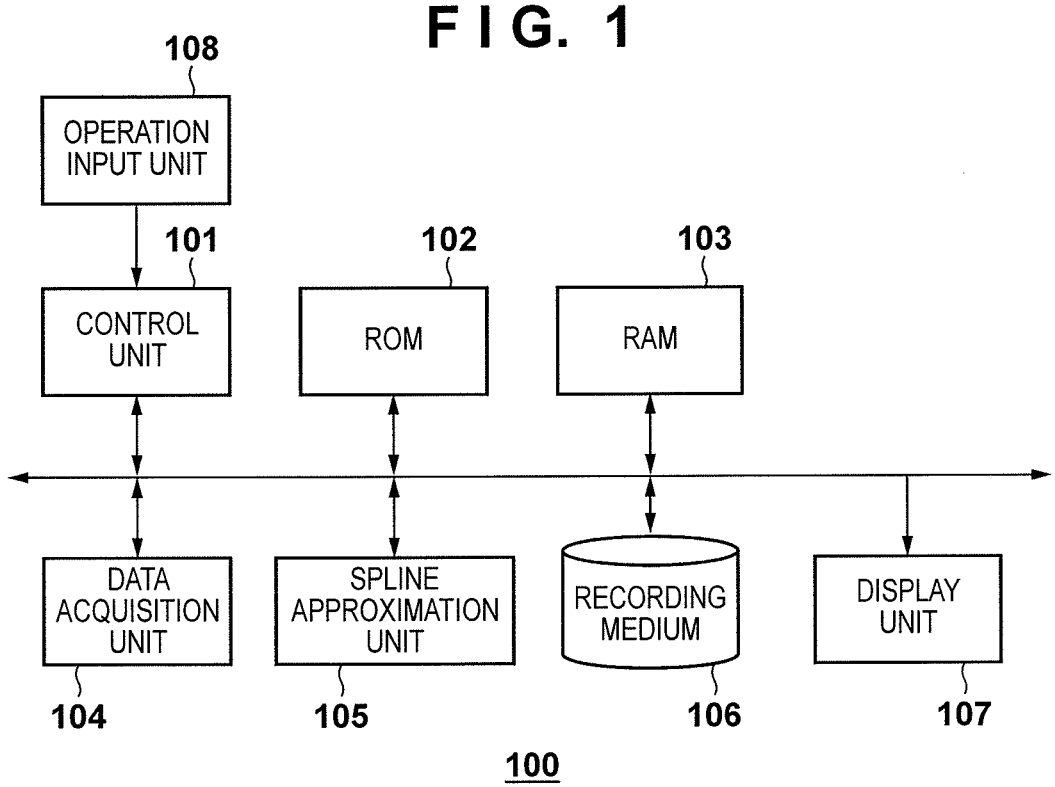
FIG. 1 is a block diagram showing a functional configuration of a PC 100 according to an embodiment of the present invention.

FIG. 1 is a block diagram showing a functional configuration of the PC 100 according to an embodiment of the present invention.

A control unit 101 is, for example, a CPU. The control unit 101 controls the operation of each block provided in the PC 100. Specifically, the control unit 101 controls the operation of each block by reading out an operating program of the block stored in a ROM 102, expanding the operating program in a RAM 103, and executing the operating program.

The ROM 102 is, for example, a rewritable nonvolatile memory. The ROM 102, in addition to the operating programs of the blocks provided in the PC 100, stores information such as parameters required in the operations of the blocks. Note that although operating programs for operating the blocks are described in the present embodiment as being stored in the ROM 102, these programs may, for example, be stored on a recording medium 106 as applications. The RAM 103 is a volatile memory. The RAM 103 is used not only as an area for expanding the operating programs of the blocks but also as a storage area for temporarily storing intermediate data output in the operations of the blocks and the like.

Note that although processing is described in the present embodiment as being realized in each block provided in the PC 100 as hardware, implementation of the present invention is not limited thereto, and the processing of each block may also be realized by a program that performs similar processing to the block.

The data acquisition unit 104 is an input interface that receives input of waveform data to be spline-approximated by the PC 100 of the present embodiment. In the present embodiment, waveform data targeted for approximation by a nonuniform B-spline is described as being motion data captured by a motion capture system. However, implementation of the present invention is not limited to approximating motion data. Also, although the data acquisition unit 104 is described as receiving input of waveform data in the present embodiment, the waveform data targeted for approximation may be recorded on the recording medium 106 discussed below.

A spline approximation unit 105 converts the input waveform data targeted for approximation into data approximated by a nonuniform B-spline. Here, a specific configuration of the spline approximation unit 105 of the present embodiment will be described using FIG. 2.

Configuration of Spline Approximation Unit 105

Figure 2:
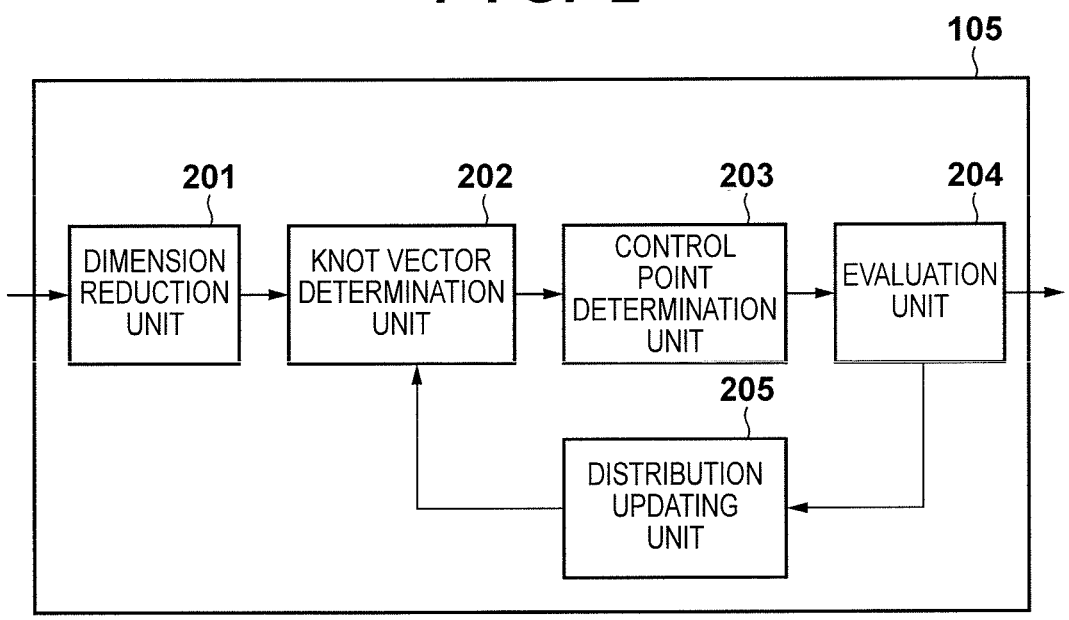
FIG. 2 is a block diagram showing an internal configuration of a spline approximation unit 105 according to an embodiment of the present invention.

FIG. 2 is a diagram showing the flow of processing by the spline approximation unit 105 provided in the PC 100.

A dimension reduction unit 201 performs processing for reducing the dimensions of the input waveform data targeted for approximation. Specifically, the dimension reduction unit 201 performs dimension reduction by performing principal component analysis (PCA) that involves removing redundancy from the waveform data targeted for approximation and extracting principal components. Motion capture data has dimensions (channels) corresponding in number to the degrees of freedom of the capture target, for example. Since it is possible for motion data to have correlation between channels, in the present embodiment the dimension reduction unit 201 performs dimension reduction on such data by performing principal component analysis. For example, assuming the waveform data targeted for approximation is $y_n \in \mathcal{R}^M, n \in \{1, \ldots, N\}$ (where M is the number of channels of the data and N is the number of frames (data amount in the time direction)), the waveform data is dimension-reduced to $x_n \in \mathcal{R}^L, n \in \{1, \ldots, N\}$ by principal component analysis in the dimension reduction unit 201. Note that the number of principal components L is determined by criteria such as the tolerance of approximation error, the lower limit of eigenvalues or the cumulative contribution ratio of eigenvalues.

Note that if the waveform data has a three-dimensional rotating channel, principal geodesics analysis (PGA) may be used instead of the linear PCA. Also, the waveform data of the present embodiment is described as having motion data of a plurality of channels. However, if the waveform data is only motion data of one channel, for example, or if the waveform data is constituted by motion data that is clearly not correlated, the processing by the dimension reduction unit 201 need not be executed.

In the spline approximation unit 105 of the present embodiment, the optimal internal knots and control points of the nonuniform B-spline approximating the waveform data are determined using constituent units from a knot vector determination unit 202 to an evaluation unit 204. The processing performed by the constituent units from the knot vector determination unit 202 to the evaluation unit 204 is based on Covariance Matrix Adaptation Evolution Strategy (CMA-ES). CMA-ES is a quasi parameter-free algorithm in which general-purpose reference values are prepared for a number of parameters that are required in the evolutionary process. In other words, utilizing CMA-ES eliminates the need to input parameters that require inputting, particularly parameters that are not intuitive for the user, compared with conventional methods of determining the optimal arrangement of internal knots and control points. With the technique of the present invention, the only parameters the user needs to input are parameters whose affect on approximation accuracy can be readily comprehended by the user, such as the number of samples S, the number of control points K+1 to be arranged and the degree of the B-spline basis function D.

Dimension-reduced waveform data $x_n$ is approximated as the following nonuniform B-spline:

$$\tilde{x}(\tau) = \sum_{k=0}^{K} B_{k,D}(\tau) \cdot c_k, \; 0 \leq \tau \leq 1$$

$$B_{k,d}(\tau) = \frac{\tau - t_k}{t_{k+d} - t_k} B_{k,d-1}(\tau) + \frac{t_{k+d+1} - \tau}{t_{k+d+1} - t_{k+1}} B_{k+1,d-1}(\tau)$$

$$B_{k,0}(\tau) = \begin{cases} 1 & (t_k \leq \tau \leq t_{k+1}) \\ 0 & \text{otherwise} \end{cases}$$

$$\forall k: t_k \leq t_{k+1}$$

$$t_0 = 0, \; t_{K+D+1} = 1$$

where
 $B_{k,d}(\tau)$ is the B-spline basis function,
 D is the degree of the B-spline basis function,
 $t = \{t_0, \ldots, t_{K+D}\}$ is the knot vector,
 $c_k \in R^L$, $k \in \{0, \ldots, K\}$ are the control points, and
 K+1 is the number of control points.

At this time, the possible range of $\tau$, that is, from the first frame to the last frame of the waveform data is
 $t_0 = \ldots = t_D = 0$
 $t_K = \ldots = t_{K+D} = 1$
given $t_D \leq \tau \leq t_k$. That is, there will be K−D−1 internal knots from $t_{D-1}$ to $t_{k-1}$.

The knot vector determination unit 202 determines, for the dimension-reduced waveform data, candidate knot vectors of the nonuniform B-spline that are targeted for evaluation. Specifically, the knot vector determination unit 202 first samples the width (interval width) between the nonuniform knots in each knot vector according to a multivariate normal distribution having a predetermined mean and variance. The knot vector determination unit 202 then determines the knot vectors according to the plurality of sampled interval widths. As mentioned above, the knot vectors satisfy the following conditions:
 $t_0 = \ldots = t_D = 0$
 $t_K = \ldots = t_{K+D} = 1$
Thus, the internal knots to be evaluated are substantively determined by the knot vector determination unit 202.

Note that, in the present embodiment, CMA-ES does not directly set the positions of knots as sampling targets, that is, as convergence solutions, but rather sets the interval widths of the knot vector as convergence solutions. This is to avoid the numbering being changed in the case where the position of each knot is directly derived based on CMA-ES, despite the knots having being numbered in order of time. Specifically, if numbered knots are changed, the precondition that the components (knots) of the knot vector monotonically increase will no longer be satisfied, resulting in convergence to an erroneous solution or computational failure without convergence. In other words, if a change is admitted, re-sorting in the time direction is required in order to satisfy the precondition that the knots increase monotonically. However, if re-sorting is performed, redundant processing for also reflecting the sorting result in the later-mentioned mean and covariance matrix of CMA-ES is required in addition to the sorting. Thus, in the present embodiment, the aim is to reliably satisfy the condition that the knots increase monotonically without performing redundant processing, by using interval width as the sampling target of CMA-ES.

For example, the knot vector determination unit 202 first samples S interval width sequences (defines nonuniform interval widths between knots in each knot vector to be evaluated) according to the multivariate normal distribution, in order to define the knot vectors to be evaluated. The knot vector determination unit 202 then determines S nonuniform knot vectors based on the S sampled interval width sequences $\tilde{t}_s$, $s \in \{1, \ldots, S\}$.

Here, each element (interval width) in one interval width sequence defines $$\Delta \tilde{t}_d = \tilde{t}_d - \tilde{t}_{d-1}$$

and K+D+1 components of the knot vectors are obtained by adding the interval widths in order.

Note that the knot vector determination unit 202 may determine each interval width so as to maintain the condition
 $\Delta \tilde{t}_d \geq 0$
by applying a simple function such as
 $\max(\Delta \tilde{t}_d, 0)$
so that the elements of the knot vector increase monotonically in order of time. Also, after the elements of the knot vectors have been determined according to the interval widths, the elements of the knot vectors are assumed to be scaled uniformly using a factor α that satisfies:

$$t_{K+D} = \sum_{d=1}^{K+D} \alpha \Delta \tilde{t}_d = 1$$

The control point determination unit 203 determines the optimal control point sequence for each of the S knot vectors determined by the knot vector determination unit 202. The optimal control point sequence for each knot vector can be uniquely determined by using a least-squares method.

For example, if the control point sequence is:
 $\tilde{C}_s = [\tilde{c}_{s,0} \ldots \tilde{c}_{s,K}]^T$
the optimal solution can be determined by solving the linear system:

$$B_{ij}|_{\Delta t_s} \tilde{C}_s = X$$

where $$B_{ij}|_{\Delta t_s} = B_{j,D}|_{\Delta t_s} \frac{i}{N-1}$$

and the nth column of X is $x_n$. Note that Moore-Penrose pseudoinverse or QR decomposition may be used in order to calculate this over-constrained maximum error solution.

The evaluation unit 204 evaluates the error with the waveform data targeted for approximation (dimension-reduced waveform data), for each combination of a knot vector to be evaluated and the optimal control point sequence determined for the knot vector by the control point determination unit 203. Specifically, the evaluation unit 204 evaluates a root mean square error:

$$E_{RMS} = \sqrt{\frac{1}{N}\sum_{n=1}^{N}\|x_n - \tilde{x}(\tau_n)\|^2}$$

$$\tau_n = \frac{n-1}{N-1}$$

as the approximation accuracy of each combination of a knot vector and an optimal control point sequence. That is, the evaluation unit 204 performs evaluation for each generation, with this root mean square error as the objective function in CMA-ES. That is, the attainment target of CMA-ES is to determine the optimal arrangement of internal knots and control points at which this objective function is minimized. Note that although an objective function is described in the present embodiment as the root mean square error, the use of other objective functions can be readily comprehended.

If a convergence solution at which the objective function is minimized is not obtained as a result of the evaluation by the evaluation unit 204, a distribution updating unit 205 updates the multivariate normal distribution for setting the interval width in the knot vector determination unit 202.

Updating Multivariate Normal Distribution in CMA-ES

In CMA-ES, candidate solutions (S interval widths in the present embodiment) in each generation are set based on the multivariate normal distribution of n dimensions. When the number of samples of candidate solutions of a given generation k is taken as $\lambda$ (>1), the candidate solutions
$x_i \in \Re^n, i \in \{1, \ldots, \lambda\}$
satisfy the following relationship $$x_i \sim N(m_k, \sigma_k^2 C_k))$$

$$\sim m_k + \sigma_k \times N(0, C_k)$$

where
 $m_k$ is the distribution mean,
 $\sigma_k$ is the step-size ($\sigma_k > 0$),
 $C_k$ is a symmetric and positive n×n covariance matrix ($C_0 = 1$), and
 $\sigma_k^2 C_k$ is the distribution variance.

In other words, with CMA-ES, convergence solutions are derived while changing the multivariate normal distribution of each generation, by updating the distribution mean and variance (covariance matrix and step-size).

First, the distribution mean of the next generation k+1 is updated as p ($\leq \lambda$) candidate solutions in ascending order of the objective function f-values of the $\lambda$ candidate solutions of the generation k:

$$m_{k+1} = \sum_{i=1}^{\mu} w_i x_{i:\lambda}$$

$$= m_k + \sum_{i=1}^{\mu} w_i (x_{i:\lambda} - m_k)$$

using $x_{1:\lambda}, x_{2:\lambda}, \ldots, x_{\mu:\lambda}$
$f(x_{1:\lambda}) \leq f(x_{2:\lambda}) \leq \ldots f(x_{\mu:\lambda})$ where
 $w_i$ is a positive weight coefficient $$\left(w_1 \geq w_2 \geq \ldots \geq w_\mu > 0, \sum_{i=1}^{\mu} w_i\right)$$

and the updated distribution mean is not simply the mean of $\mu$ candidate solutions in ascending order of objective function f-values but a mean weighted toward candidate solutions with smaller f-values. Note that weight coefficients are generally determined to satisfy:

$$\mu_w := \frac{1}{\sum_{i=1}^{\mu} w_i^2} \approx \frac{\lambda}{4}, \mu \leq \frac{\lambda}{2}$$

Also, the step-size of the next generation k+1, that is, the parameter indicating the relative size of the covariance matrix and influencing the speed and accuracy of convergence, is updated using Cumulative Step-size Adaptation (CSA). First, the evolution path $p_\sigma$ (initially set to zero vector) is updated $$p_\sigma \leftarrow (1 - c_\sigma) p_\sigma + \sqrt{1 - (1 - c_\sigma)^2} \sqrt{\mu_w} C_k^{-1/2} \frac{m_{k+1} - m_k}{\sigma_k}$$

Thereafter, the step-size of the next generation k+1 is updated using the updated $p_\sigma$:

$$\sigma_{k+1} = \sigma_k \times \exp\left(\frac{c_\sigma}{d_\sigma}\left(\frac{\|p_\sigma\|}{E\|N(0,I)\|} - 1\right)\right)$$

where
 $c_\sigma^{-1} \approx n/3$ is the backward time horizon for the evolution path $p_\sigma$ ($c_\sigma^{-1} > 1$), $$\mu_w = \left(\sum_{i=1}^{\mu} w_i^2\right)^{-1}$$

is the variance effective selection mass ($1 \leq \mu_w \leq \mu$), and
 $d_\sigma$ is the damping parameter (usually $\approx 1$).

Finally, the covariance matrix of the next generation k+1 is updated. First the evolution path $p_c$ (initially set to zero vector) is updated:

$$p_c \leftarrow (1-c_c)p_c + 1_{[0,\alpha\sqrt{n}]}(\|p_\sigma\|)\sqrt{1-(1-c_c)^2}\sqrt{\mu_w}\frac{m_{k+1}-m_k}{\sigma_k}$$

Thereafter, the covariance matrix of the next generation k+1 is updated using the updated $p_c$:

$$C_{k+1} = (1-c_1-c_\mu-c_s)C_k + c_1 p_c p_c^T + c_\mu \sum_{i=1}^{\mu} w_i \frac{x_{i:\lambda}-m_k}{\sigma_k}\left(\frac{x_{i:\lambda}-m_k}{\sigma_k}\right)^T$$

where $c_c^{-1} \approx n/4$ is the backward time horizon for the evolution path $p_c$ ($c_c^{-1} > 1$)

$1_{[0,\alpha\sqrt{n}]}(\|p_\sigma\|)$ is the indicator function (evaluates to 1 iff $\|p_\sigma\| \in [0, \alpha\sqrt{n}]$, $\alpha \approx 1.5$), $c_s(1-1_{[0,\alpha\sqrt{n}]}(\|p_\sigma\|)^2)c_1 c_s(2-c_c)$ is a factor partly compensating for small variance loss if the indicator is zero, $c_1 \approx 2/n^2$ is the learning rate for the rank-one update of the covariance matrix, and $c_\mu \approx \mu_w/n^2$ is the learning rate for the rank-μ update of the covariance matrix ($<1-c_1$).

The distribution updating unit 205 thus updates the multivariate normal distribution according to the results of evaluation by the evaluation unit 204, in order to process the next generation from the knot vector determination unit 202.

The spline approximation unit 105 outputs the approximated curve of the waveform data targeted for approximation, using the arrangement positions of the optimal internal knots and control points, which are the convergence solutions determined by the constituent units from the dimension reduction unit 201 to the distribution updating unit 205.

The recording medium 106 is, for example, a built-in memory, a recording apparatus that is removably connected to the PC 100 such as a HDD, or the like. Information on the approximated curve that was spline-approximated by the spline approximation unit 105 is recorded on the recording medium 106, for example.

A display unit 107 is a display apparatus that is provided in the PC 100 such as an LCD, for example. The display unit 107 may be constituted integrally with the PC 100 or may be an external apparatus that is removably connected to the PC 100. Screens such as an input screen for inputting parameters that the user is able to set for spline approximation performed by the spline approximation unit 105, for example, are displayed on the display unit 107.

An operation input unit 108 is a user interface for receiving operation inputs that is provided in the PC 100 such as a mouse and a keyboard, for example. The operation input unit 108, on detecting that an operation input has been received, transmits a corresponding control signal to the control unit 101.

Spline Approximation Processing

Figure 3:
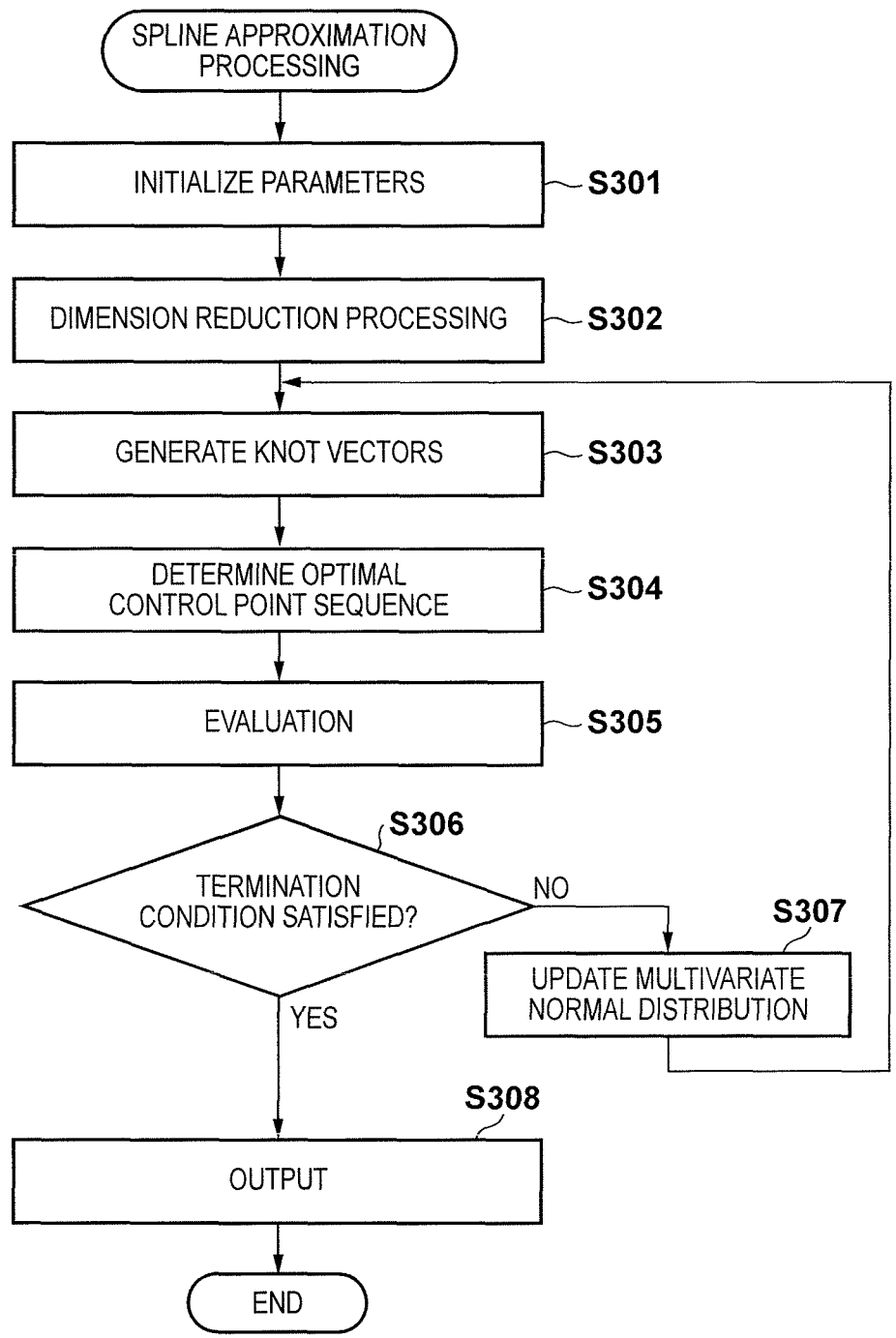
FIG. 3 is a flowchart illustrating spline approximation processing executed in the PC 100 according to an embodiment of the present invention.
Figure 4A:
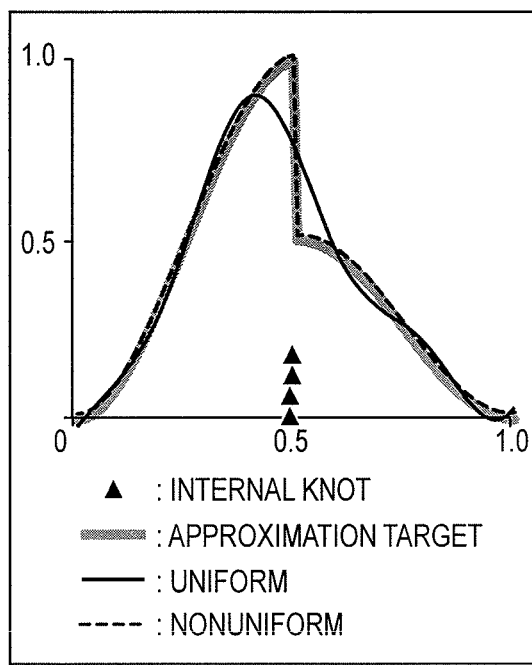
FIGS. 4A, 4B, 4C and 4D are diagrams showing approximation results of spline approximation processing according to an embodiment of the present invention.
Figure 4B:
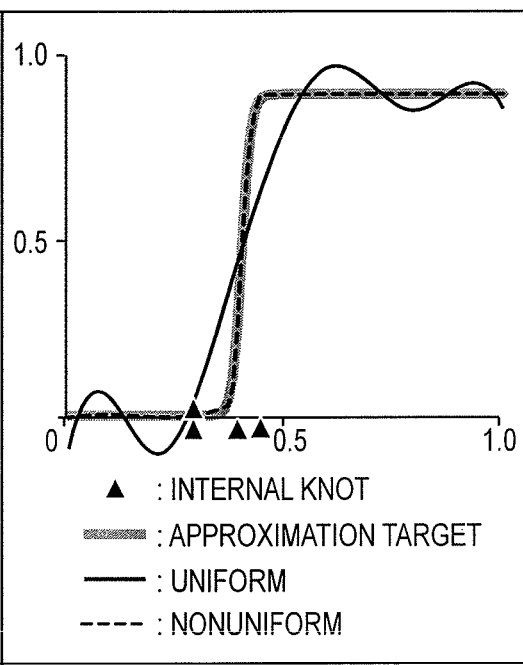
Figure 4C:
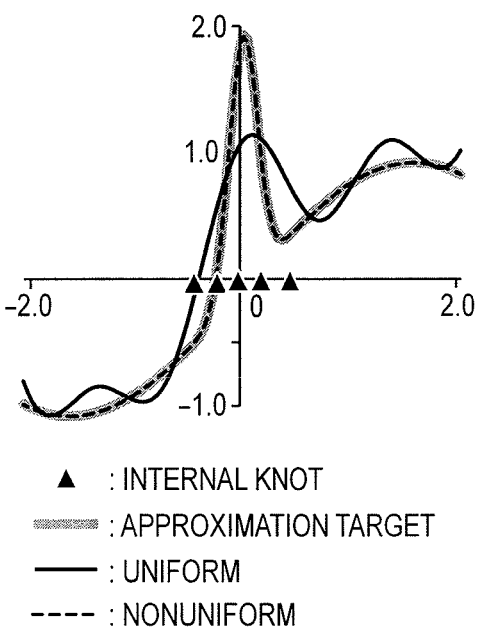
Figure 4D:
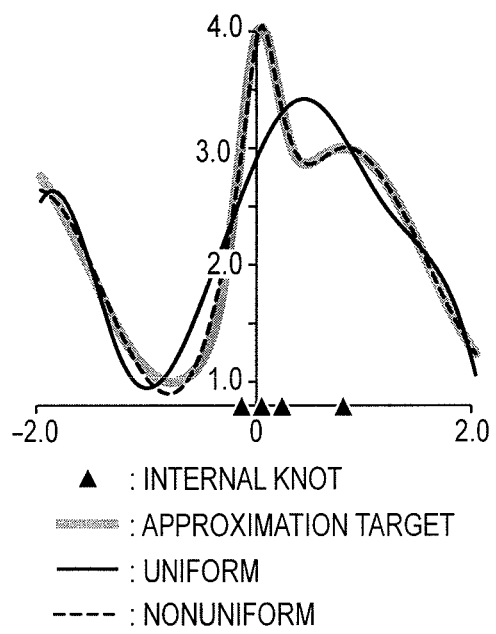

Specific processing will be described using the flowchart of FIG. 3, with regard to the spline approximation processing for performing spline approximation on waveform data that is executed by the PC 100 of the present embodiment having a configuration such as the above. Processing corresponding to this flowchart can be realized by the control unit 101 reading out a corresponding processing program stored in the ROM 102, for example, expanding the read program in the RAM 103 and executing the program. Note that this spline approximation processing is described as being started when waveform data targeted for approximation is input during execution of the program for performing spline approximation, for example.

At S301, the control unit 101 initializes the parameters in the spline approximation unit 105. The control unit 101 then inputs waveform data acquired by the data acquisition unit 104 to the spline approximation unit 105.

At S302, the dimension reduction unit 201 applies dimension reduction processing for eliminating redundant data, after performing principal component analysis on the input waveform data, under the control of the control unit 101.

At S303, the knot vector determination unit 202 samples interval widths between internal knots of a nonuniform B-spline, based on a multivariate normal distribution. Also, the knot vector determination unit 202 generates, for each sampled interval width, a knot vector based on the interval widths.

At S304, the control point determination unit 203 determines the optimal control point sequence for each knot vector generated in S303, under the control of the control unit 101.

At S305, the evaluation unit 204 uses an objective function to evaluate the approximation accuracy of the nonuniform B-spline, for each combination of a knot vector and a corresponding optimal control point sequence, under the control of the control unit 101.

At S306, the control unit 101 judges whether the evaluation of approximation accuracy in the evaluation unit 204 satisfies a termination condition. That is, the control unit 101 judges whether the approximation error of the nonuniform B-spline for the dimension-reduced waveform data has been converged to a minimum. The control unit 101 shifts the processing to S308 if it is judged that the evaluation of approximation accuracy in the evaluation unit 204 satisfies the termination condition, and shifts the processing to S307 if it is judged that the termination condition is not satisfied.

At S307, the distribution updating unit 205 updates the multivariate normal distribution based on the results of the evaluation of approximation accuracy, under the control of the control unit 101. Specifically, the distribution updating unit 205 first selects a predetermined number of interval widths in ascending order of the approximation errors based on the evaluation results. The distribution updating unit 205 then updates the mean of the multivariate normal distribution based on the predetermined number of selected interval widths. Also, the distribution updating unit 205 similarly updates the step-size and the covariance matrix, and updates the variance of the multivariate normal distribution. The control unit 101 returns the processing to S303 when updating of the multivariate normal distribution by the distribution updating unit 205 is completed.

On the other hand, if it is judged in S306 that the evaluation of approximation accuracy satisfies the termination condition, the control unit 101, at S308, causes the spline approximation unit 105 to output information on the nonuniform B-spline having parameters that are based on the obtained convergence solutions, and completes the spline approximation processing.

This enables the PC 100 of the present embodiment to obtain a nonuniform B-spline that approximates waveform data targeted for approximation utilizing CMA-ES.

Implementation Results

Approximation results obtained by implementing the abovementioned spline approximation processing are shown in FIGS. 4A to 4D. FIGS. 4A to 4D each show, for one-dimensional waveform data that for the sake of simplicity does not require dimension reduction, a curve in the case where the waveform data is approximated by a uniform B-spline, a nonuniform B-spline approximated using the method of the present invention, and the internal knots of the nonuniform B-spline. As is also evident from the diagrams, approximation accuracy equivalent to conventional spline approximation technology utilizing genetic algorithms can be exhibited.

Also, the use of a number of parameters was described with regard to the updating of a multivariate normal distribution by the distribution updating unit 205. However, with regard to these parameters, it is possible to use optimal default values set so as to enable CMA-ES to respond to a wide-range of problems, such as described in Hansen, N., Kern, S. (2004), "Evaluating the CMA evolution strategy on multimodal test functions", in proceedings of Eighth International Conference on Parallel Problem Solving from Nature, pp. 282-291. That is, in the spline approximation processing of the PC 100 according to the present embodiment, the number of samples S, the number of control points K+1 to be arranged and the degree of the B-spline basis function D are parameters that require manual input. Note that the number of internal knots (K−D−1) is also determined by these parameters. Also, if necessary the number of the principal components L may be configured as a parameter that requires manual input.

FIGS. 4A to 4D show the results of processing performed using these optimal values, and it should be obvious that favorable results are obtained even using the default values. That is, the present invention enables an approximation system to be provided that does not require adjustment of various manually input parameters that the user is not able to comprehend intuitively.

As described above, the information processing apparatus of the present embodiment is able to approximate waveform data to a suitable nonuniform B-spline without needing unnecessary parameter tuning by the user. Specifically, the information processing apparatus selects a plurality of interval width sequences of the internal knots of a nonuniform B-spline that approximates the waveform data based on a multivariate normal distribution, and then determines a knot vector based on each of the selected interval width sequences, and an optimal control point sequence for each knot vector. Also, the information processing apparatus repeats, for the nonuniform B-spline that is defined for each combination of a knot vector and an optimal control point sequence corresponding to the knot vector, the selection of interval width sequences, the determination of knot vectors and optimal control point sequences and the evaluation thereof, until an evaluation whose objective function is minimized is obtained. Meanwhile, the information processing apparatus updates the mean and variance of the multivariate normal distribution, based on a predetermined number of interval width sequences selected in ascending order of the approximation errors from the plurality of selected interval width sequences, and causes the operations to be repeated for the next generation using the multivariate normal distribution after updating.

Other Embodiments

The present invention is not restricted to the above embodiments, and various changes and modifications are possible without departing from the spirit or scope of the invention. An information processing apparatus according to the present invention can also be realized by a program for causing a computer to function as the information processing apparatus. The program can be provided or distributed by being recorded on a computer-readable recording medium or via a telecommunications line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252582, filed Nov. 16, 2012, which is hereby incorporated by reference herein in its entirety.

What is claimed is:

1. An information processing apparatus for optimizing an arrangement of internal knots and control points of a nonuniform B-spline that approximates waveform data, comprising:
   a selector which is able to select a plurality of nonuniform interval width sequences for a knot interval between internal knots, based on a multivariate normal distribution;
   a generator which is able to generate, for each of the plurality of interval width sequences selected by the selector, a knot vector that is based on the interval width sequence;
   a determiner which is able to determine an optimal control point sequence for each knot vector generated by the generator;
   an evaluator which is able to use an objective function to evaluate an approximation error with the waveform data, for a nonuniform B-spline defined for each combination of a knot vector and an optimal control point sequence corresponding to the knot vector; and
   a controller which is able to perform control so as to repeat operations including the selection of a plurality of interval width sequences by the selector, the generation of knot vectors by the generator, the determination of optimal control point sequences by the determiner, and the evaluation by the evaluator, until an evaluation indicating that the approximation error has been converged to a value regarded as a minimum is obtained by the evaluator,
   wherein the controller, in the case where the evaluation indicating that the approximation error has been converged to the value regarded as the minimum is not obtained by the evaluator, updates a mean and a variance of the multivariate normal distribution, based on a predetermined number of interval width sequences selected in ascending order of approximation errors from the plurality of interval width sequences selected by the selector, and causes the operations to be repeated using the multivariate normal distribution after updating.

2. The information processing apparatus according to claim 1, further comprising:
   a reducer which, in the case where the waveform data is data constituted by a plurality of components that are mutually correlated, is able to dimension-reduce the waveform data to data constituting a principal component of the waveform data,
   wherein the controller, in the case where the waveform data is the data constituted by the plurality of components that are mutually correlated, controls the selector, the generator, the determiner and the evaluator, so as to optimize the arrangement of internal knots and control points for the waveform data that has been dimension-reduced by the reducer.

3. The information processing apparatus according to claim 1, wherein the determiner determines the optimal control point sequence using a least-squares method.

4. The information processing apparatus according to claim 1, further comprising:
   an acquirer which is able to acquire a number of interval width sequences selected by the selector, a number of control points determined by the determiner per knot vector, and a number of dimensions of a B-spline basis function, wherein the controller causes the selector, the determiner and the evaluator to operate according to the numbers acquired by the acquirer and a parameter whose value is preset.

5. The information processing apparatus according to claim 1, wherein the waveform data is motion data obtained by motion capture.

6. The information processing apparatus according to claim 1, wherein the controller controls selection of the plurality of interval width sequences by the selector, based on Covariance Matrix Adaptation Evolution Strategy.

7. A method of controlling an information processing apparatus for optimizing an arrangement of internal knots and control points of a nonuniform B-spline that approximates waveform data, comprising:

selecting, by a processor, a plurality of nonuniform interval width sequences for a knot interval between internal knots, based on a multivariate normal distribution;

generating, by the processor and for each of the plurality of interval width sequences selected in the selecting, a knot vector that is based on the interval width sequence;

determining, by the processor, an optimal control point sequence for each knot vector generated in the generating;

using an objective function to evaluate an approximation error with the waveform data, for a nonuniform B-spline defined for each combination of a knot vector and an optimal control point sequence corresponding to the knot vector; and performing, by the processor, control so as to repeat operations including selection of a plurality of interval width sequences in the selecting, generation of knot vectors in the generating, determination of optimal control point sequences in the determining, and evaluation in the evaluating, until an evaluation indicating that the approximation error has been converged to a value regarded as a minimum is obtained in the evaluating, wherein, in the performing, in the case where the evaluation indicating that the approximation error has been converged to the value regarded as the minimum is not obtained in the evaluating, the processor updates a mean and a variance of the multivariate normal distribution, based on a predetermined number of interval width sequences selected in ascending order of approximation errors from the plurality of interval width sequences selected in the selecting, and repeats the operations using the multivariate normal distribution after updating.

8. A non-transitory computer-readable recording medium storing a program for causing a computer to function as the information processing apparatus according to claim 1.

* * * * *